(12) United States Patent
Sharon et al.

(10) Patent No.: US 8,437,183 B2
(45) Date of Patent: May 7, 2013

(54) AUXILIARY PARITY BITS FOR DATA WRITTEN IN MULTI-LEVEL CELLS

(75) Inventors: Eran Sharon, Rishon Lezion (IL); Idan Alrod, Herzliya (IL)

(73) Assignee: Sandisk IL Ltd., Kfar Saba (IL)

( * ) Notice: Subject to any disclaimer, the term of this patent is extended or adjusted under 35 U.S.C. 154(b) by 204 days.

(21) Appl. No.: 13/122,469

(22) PCT Filed: Dec. 16, 2009

(86) PCT No.: PCT/IB2009/007789
§ 371 (c)(1),
(2), (4) Date: Apr. 4, 2011

(87) PCT Pub. No.: WO2011/073710
PCT Pub. Date: Jun. 23, 2011

(65) Prior Publication Data
US 2011/0252288 A1     Oct. 13, 2011

(51) Int. Cl.
*G11C 11/34* (2006.01)
(52) U.S. Cl.
USPC ............ 365/185.01; 365/185.22; 365/185.09; 365/185.28; 365/185.18; 365/185.03; 365/185.33; 714/54; 714/42; 714/758; 714/763; 714/766; 714/778
(58) Field of Classification Search .................. None
See application file for complete search history.

(56) References Cited

U.S. PATENT DOCUMENTS

| | | | |
|---|---|---|---|
| 5,321,703 A | 6/1994 | Weng | |
| 7,317,636 B2 * | 1/2008 | Ide et al. | 365/185.22 |
| 7,320,089 B2 * | 1/2008 | Yamamoto et al. | 714/6.32 |
| 7,443,726 B2 | 10/2008 | Guterman | |
| 7,724,580 B2 * | 5/2010 | Li et al. | 365/185.22 |
| 7,843,728 B2 * | 11/2010 | Honda et al. | 365/185.03 |
| 2005/0221204 A1 | 10/2005 | Kimura | |
| 2009/0177943 A1 | 7/2009 | Silvus et al. | |
| 2009/0279363 A1 * | 11/2009 | Roohparvar | 365/185.22 |
| 2012/0155169 A1 * | 6/2012 | Honda et al. | 365/185.03 |

FOREIGN PATENT DOCUMENTS

| | | |
|---|---|---|
| WO | 2007043042 A2 | 4/2007 |
| WO | 2008067185 A1 | 6/2008 |

OTHER PUBLICATIONS

International Search Report and Written Opinion for International Application No. PCT/IB2009/007709 dated Jul. 7, 2010, 19 pages.
Shibata, Noboru et al. "A 70nm 16Gb 16-Level-Cell NAND Flash Memory," IEEE Journal of Solid-State Circuits, vol. 43, No. 4, Apr. 2008, pp. 929-937.

* cited by examiner

*Primary Examiner* — John Trimmings
(74) *Attorney, Agent, or Firm* — Toler Law Group, PC

(57) ABSTRACT

Methods of writing data to and reading data from memory devices and systems for writing and reading data are disclosed. In a particular embodiment, a method includes writing data bits a first time into a memory. Auxiliary parity bits are written in the memory, where the auxiliary parity bits are computed based on the data bits. Subsequent to writing the data bits a first time and writing the auxiliary parity bits, the data bits are written a second time into the memory. Writing the data bits the first time and writing the data bits the second time are directed to one or more storage elements at a common physical address in the memory. Subsequent to writing the data bits the second time, the auxiliary parity bits are discarded while maintaining the data bits in the memory.

41 Claims, 10 Drawing Sheets

US 8,437,183 B2

AUXILIARY PARITY BITS FOR DATA WRITTEN IN MULTI-LEVEL CELLS

FIELD OF THE DISCLOSURE

The present disclosure is generally related to providing auxiliary parity bits to aid in decoding data bits that are written in more than one pass or that are written in more than one portion to a memory.

BACKGROUND

Non-volatile memory devices, such as flash memory devices or removable storage cards that hold data between power cycles, may use memory cells in which multiple bits of data may be written, called multi-level cell (MLC) flash memory. An example of a common mode of operation is that the flash memory system receives first data to be written into the flash from an external host. The flash memory system may write the first data into the flash, verify that the data can be reliably decoded, and then signal to the host that it is ready to accept new data and the host does not need to maintain the first data any longer. The writing rate of the system may depend on the time it takes the flash to write a given data in a reliable way.

In MLC flash systems, the data bits may be written to the memory cell in multiple passes, such that each pass overrides the previous pass, and typically the data can be reliably decoded only after the last pass is complete. (Writing the same data in several passes is one of the measures taken by the flash controller to minimize the effects of cross coupling from neighboring cells). In some cases only the Most Significant Bits (MSBs) may be written during the first pass, such that after the first pass the cell is partitioned in a very coarse way between a low state and a high state. The MSBs may suffer from unreliability due to insufficient programming pulses, and cross-coupling from data bits written afterwards. This situation may be corrected in the second pass when all bits are written. In another case all the data may be written in the first pass (or passes), but in a coarse manner, thus suffering from a high error rate. Then in the last pass the programming of the data is refined, thus resulting in low error rate, ensuring that the data can be recovered with high probability by using the available Error Correction Code. However, in both cases, if the writing of the data bits is interrupted before all of the passes are completed or before each of the portions of the memory cell is written, such as by a power failure, correctly decoding the data may be difficult.

Waiting for the full process to complete and only then signaling to the host to send new data may decrease significantly the writing rate of the flash. One approach to potentially avoid postponing the host from sending new data involves configuring the memory device to include a cache in which the data is fully written to the cache in a single pass. The cache may typically be comprised of memory cells which can be written faster and with a higher reliability than the cells intended for writing the data. For example, the cache cells may be single-level cells (SLCs) that are configured to write only one bit per cell, as contrasted with other flash cells in the memory device that may be configured to write multiple bits per cell. When using a cache, if the writing of the data in multiple passes or portions is interrupted, the data can be retrieved from the cache. However, using a cache involves adding an additional step of writing each element of data. Further, writing the data to cache results in enhanced wear on the cache that may limit the usable life of the memory device. Moreover, if every string of data to be written in the device is first written in the cache, an appreciable portion of the device may have to be devoted to the cache.

SUMMARY

Methods and systems to write data to and read data from a memory device are disclosed. When data is written in multiple passes or in multiple portions of a memory cell, auxiliary parity bits are generated and written in a separate region of the memory device. The auxiliary parity bits include more bits than ordinary parity bits to facilitate decoding of the data bits. If writing the data is interrupted before the multiple passes are completed or the multiple portions are written, the auxiliary parity bits may be retrieved and used to decode the data. The auxiliary parity bits may be discarded once the multiple passes are completed or after the multiple portions are written to free the memory used to write the auxiliary parity bits for other uses.

DETAILED DESCRIPTION

Figure 1:
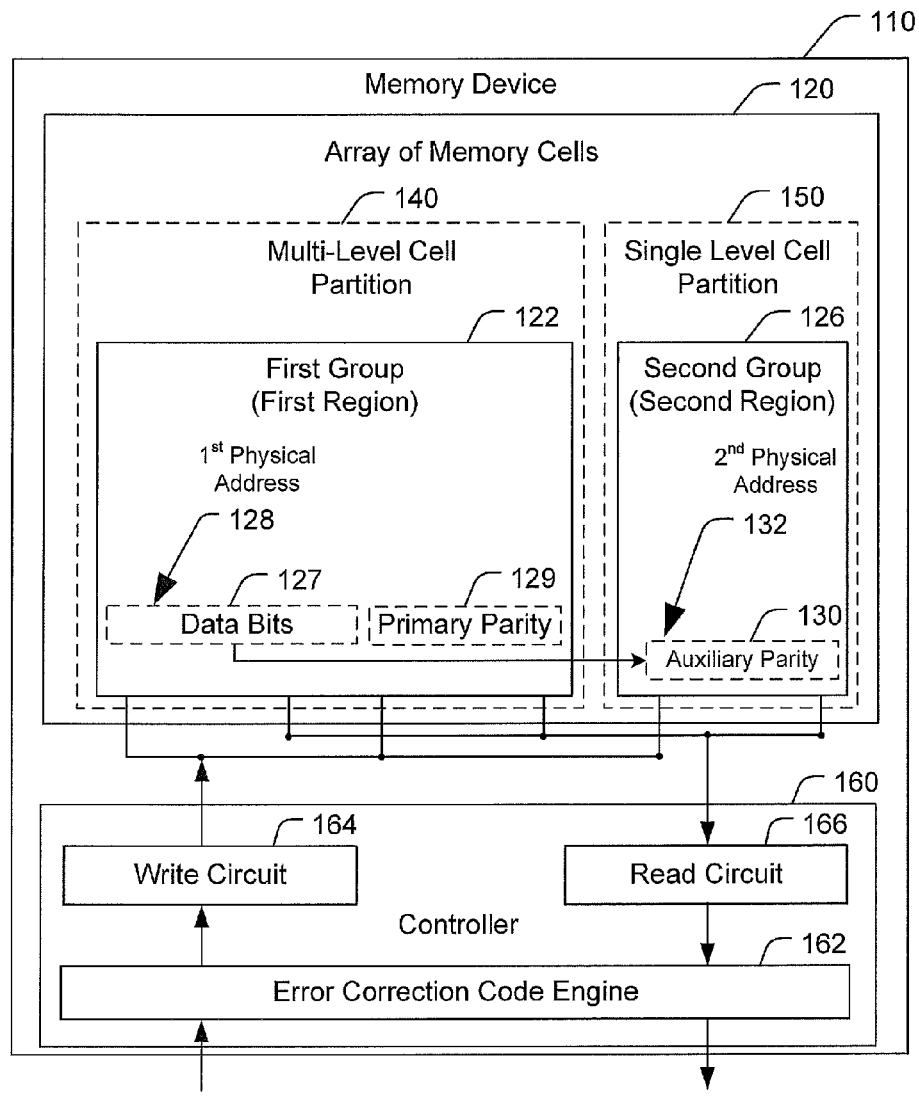
FIG. 1 is a block diagram of a particular embodiment of a memory device including a multi-level cell partition to write data and a single level cell partition to write auxiliary parity bits.
Figure 1:
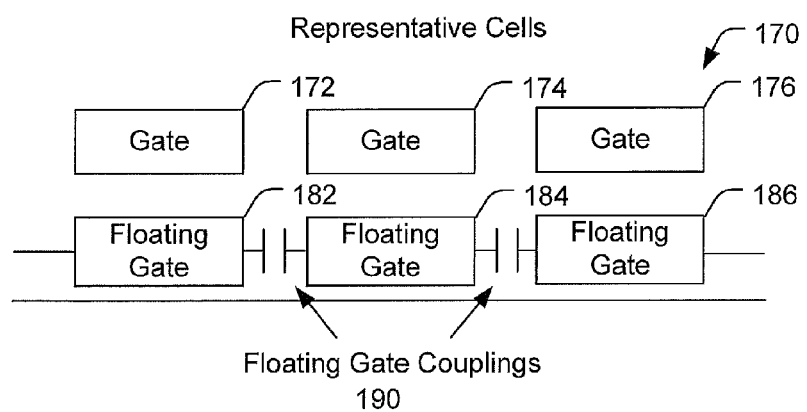

FIG. 1 is a block diagram of a particular embodiment of a memory device 110 including a multi-level cell (MLC) partition 140 to write data and a single-level cell (SLC) partition 150 to write auxiliary parity bits. Actually each cell of the SLC partition 150 contains one bit, or two levels, thus, the SLC partition 150 may be regarded as a single-bit cell (SBC) partition. Nonetheless, using the terms SLC for a one bit cell, and MLC for a cell configured to write more than one bit, are commonly used in describing flash memory. Therefore throughout this application the terms SLC and MLC shall be used.

The memory device 110 includes an array of memory cells 120 and a controller 160. The array of memory cells 120 includes the multi-level cell partition 140 and the single level cell partition 150. The controller 160 includes an error correction code (ECC) engine 162, a write circuit 164, and a read circuit 166. The ECC engine 162 is used to generate primary parity bits 129 and auxiliary parity bits 130 for data bits 127 according to selected ECC routines to generate parity bits that may be used in the reading process to decode the data bits 127. The write circuit 164 is used to write data and parity bits to appropriate regions of the array of memory cells 120. The read circuit 166 is used to read the data bits 127, primary parity bits 129, and auxiliary parity bits 130 from the array of memory cells 120. The ECC engine 162 is used to decode the data bits 127 using the primary parity bits 129 or using the auxiliary parity bits 130 as appropriate and as described further with reference to FIGS. 4, 5, and 7-10.

To decode the data bits 127 written in the memory device 110, the data bits 127 and one or both of the primary parity bits 129 and the auxiliary parity bits 130 are provided to the ECC engine 162. When the primary parity bits 129 or the auxiliary parity bits 130 are used may depend on when the data bits 127 are read. For example, in a multiple pass writing process as described with reference to FIG. 3, the data bits 127 may be decoded after only a first pass has been completed. In this case, the auxiliary parity bits 130 may be used, with or without using the primary parity bits 129, to decode the data bits 127. However, after one or more additional passes have been completed, the auxiliary parity bits 130 may not be necessary for reliable decoding of the data bits 127 and decoding may proceed, for example, using the primary parity bits 129 but not using the auxiliary parity bits 130. As an additional example, when the data bits 127 are written in multiple portions as described with reference to FIG. 6, the first portion of data bits 127 may be decoded after only the first portion of the data bits 127 has been written by a first pass. In this case, the auxiliary parity bits 130 may be used, with or without using the primary parity bits 129, to decode the data bits 127.

The multi-level cell partition 140 and the single-level cell partition 150 of the array of memory cells 120 each include a plurality of cells, such as the representative group of cells 170 shown in FIG. 1. Each of the cells includes a control gate 172, 174, 176, and a floating gate 182, 184, 186. In single-level cells, the floating gates 182, 184, 186 are each used to write a threshold voltage representing one of two states, whereas in multi-level cells, the floating gates 182, 184, 186 may be used to write a threshold voltage that is varied to write one of multiple states. As shown in the group of representative cells, cross-couplings between the floating gates 182, 184, 186 may result in the threshold voltage written in one of the floating gates 182, 184, 186 being affected by the threshold voltage written in another of the floating gates 182, 184, 186.

In a single-level cell, the floating gate couplings 190 may not affect the decoding of data values written to each of the cells in the way that the floating gate couplings 190 may affect the decoding of data values written to multi-level cells. Because single-level cells are written with only two different states, a wider guard band can be used between the voltages of single level cells than is possible between the multiple voltages that may be written in a multi-level cell. The wider guard band allows for some change in the voltage written to the single-level cell as a result of the floating gate couplings 190 without affecting how the voltage may be decoded. By contrast, because the guard bands are smaller between the multiple voltages that may be written to a multi-level cell, a change in the voltage written to a multi-level cell as a result of the floating gate couplings 190 may be more likely to affect how the voltage written is decoded.

The multi-level cell partition 140 includes a first group of cells in a first region 122. The first group 122, or first region, is used for the writing of data bits 127 and primary parity bits 129. The data bits 127 and the primary parity bits 129 may be written at adjacent locations at a first physical address 128. Because both the data bits 127 and the primary parity bits 129 are written in the multi-level cell partition 140, if a multiple pass or multiple portion writing process is interrupted prior to completion, the data may not be decodable and the primary parity bits may not be decodable or sufficient to decode the data.

To facilitate decoding data bits when the writing of the data bits 127 to the multi-level cell partition 140 may be interrupted prior to completion, auxiliary parity bits 130 are written to the single level cell partition 150 in the array of memory cells 120. The auxiliary parity bits 130 include a series of bits that may be used to decode the data bits 127 even when the writing of the data bits 127 to the multi-level cell partition 140 is interrupted. Because the auxiliary parity bits 130 are written to the single level cell partition 150, unlike the data bits 127 or the primary parity bits 129, the auxiliary parity bits 130 are usable after a single writing cycle. The auxiliary parity bits 130 are written at a second physical address 132 in a second group 126, or second region, of the array of memory cells 120. The second physical address 132 at which the auxiliary parity bits 130 are written may or may not be adjacent to the first physical address 128 at which the data bits are written.

The single level cell partition 150 may be regarded as a type of cache that stores series of auxiliary parity bits 130 until the corresponding data strings are written to the multi-level cell partition 140. The single level cell partition 150 may be smaller than a conventional cache that temporarily entire data strings because the auxiliary parity bits are typically not as long as the data strings with which the auxiliary parity bits are associated. Alternatively, or in addition, because typically the auxiliary parity bits include fewer bits than the corresponding data string that is written to the multi-level cell partition 140, the single cell partition 150 may benefit from reduced cell wearing, and consequently a longer useful life of the memory device 110, as compared to a similarly sized cache that stores entire data strings.

Figure 2:
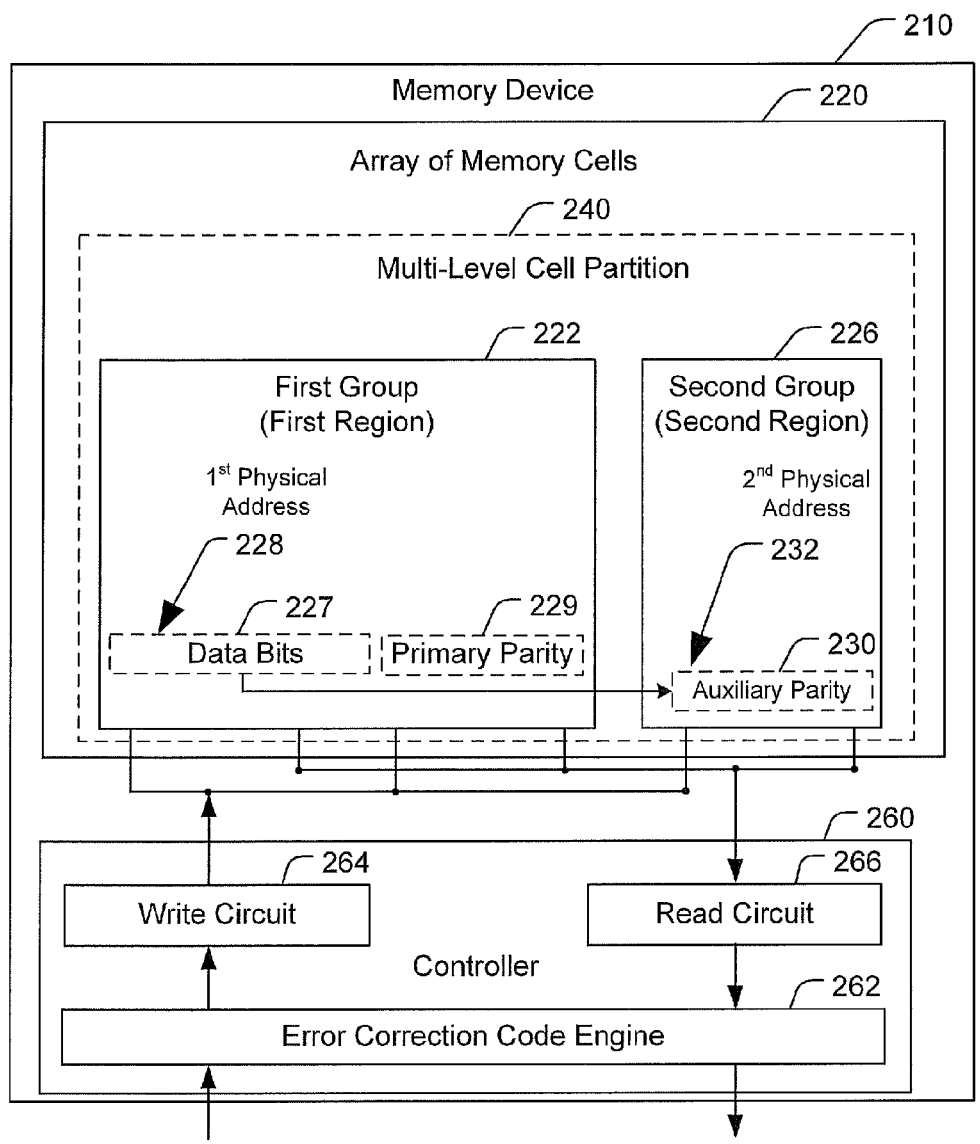
FIG. 2 is a block diagram of a particular embodiment of a memory device including a multi-level cell partition to write data, parity bits, and auxiliary parity bits.

FIG. 2 is a block diagram of a particular embodiment of a memory device 210 including a multi-level cell (MLC) partition 240 that is used to write data bits 227, primary parity bits 229, and auxiliary parity bits 230. The memory device 210 includes an array of MLC memory cells 220 and a controller 260. In contrast to the array of memory cells 120 of the memory device 110 of FIG. 1, the array of memory cells 220 does not include a single level cell partition 150 in which the auxiliary parity bits 130 are separately written. Similar to the first memory device 110, the controller 260 of the memory device 220 includes an error correction code (ECC) engine 262, a write circuit 264, and a read circuit 266. As in the example of the memory device 110 of FIG. 1, the ECC engine 262 is used to generate primary parity bits 229 and auxiliary parity bits 230 according to selected ECC routines to generate parity bits 229 and 230 that may be used in the reading process to decode the data bits 227. The write circuit 264 is used to write data bits 227 and parity bits 229 and 230 to appropriate regions 222 and 226 of the array of memory cells 240. The data bits 227 may be written to a first physical location 228 with the primary parity bits 229 being written at a same location or at an adjacent location. The auxiliary parity bits 230 may be written at a second physical location 232 that may or may not be adjacent the first physical location 228 where the data bits 227 are written. The read circuit 266 is used to read the data bits 227 and parity bits 229 and 230 from the array of memory cells 240. The ECC engine 262 is used to decode the data bits 227 using the primary parity bits 229 or using the auxiliary parity bits 230 as appropriate and as described further with reference to FIGS. 4, 5, and 7-10.

To decode the data bits 227 written in the memory device 210, the data bits 227 and one or both of the primary parity bits 229 and the auxiliary parity bits 230 are provided to the ECC engine 262. As in the example of FIG. 1, when the primary parity bits 229 or the auxiliary parity bits 230 are used may depend on when the data bits 227 are read. For example, in a multiple pass writing process as described with reference to FIG. 2, the data bits 227 may be decoded after only a first pass has been completed. Although the auxiliary parity bits 230 are written in the MLC partition 240 and, thus, desirably are written in two passes to clarify the voltage levels written, a bit length or coding pattern of the auxiliary parity bits 230 may be chosen such that the auxiliary parity bits 230 written in a single pass may enable decoding of the data bits 227. However, as in the memory device 110 of FIG. 1, after one or more additional passes have been completed, decoding of the data bits 227 may proceed, for example, using the primary parity bits 229 without using the auxiliary parity bits 230.

Figure 3:
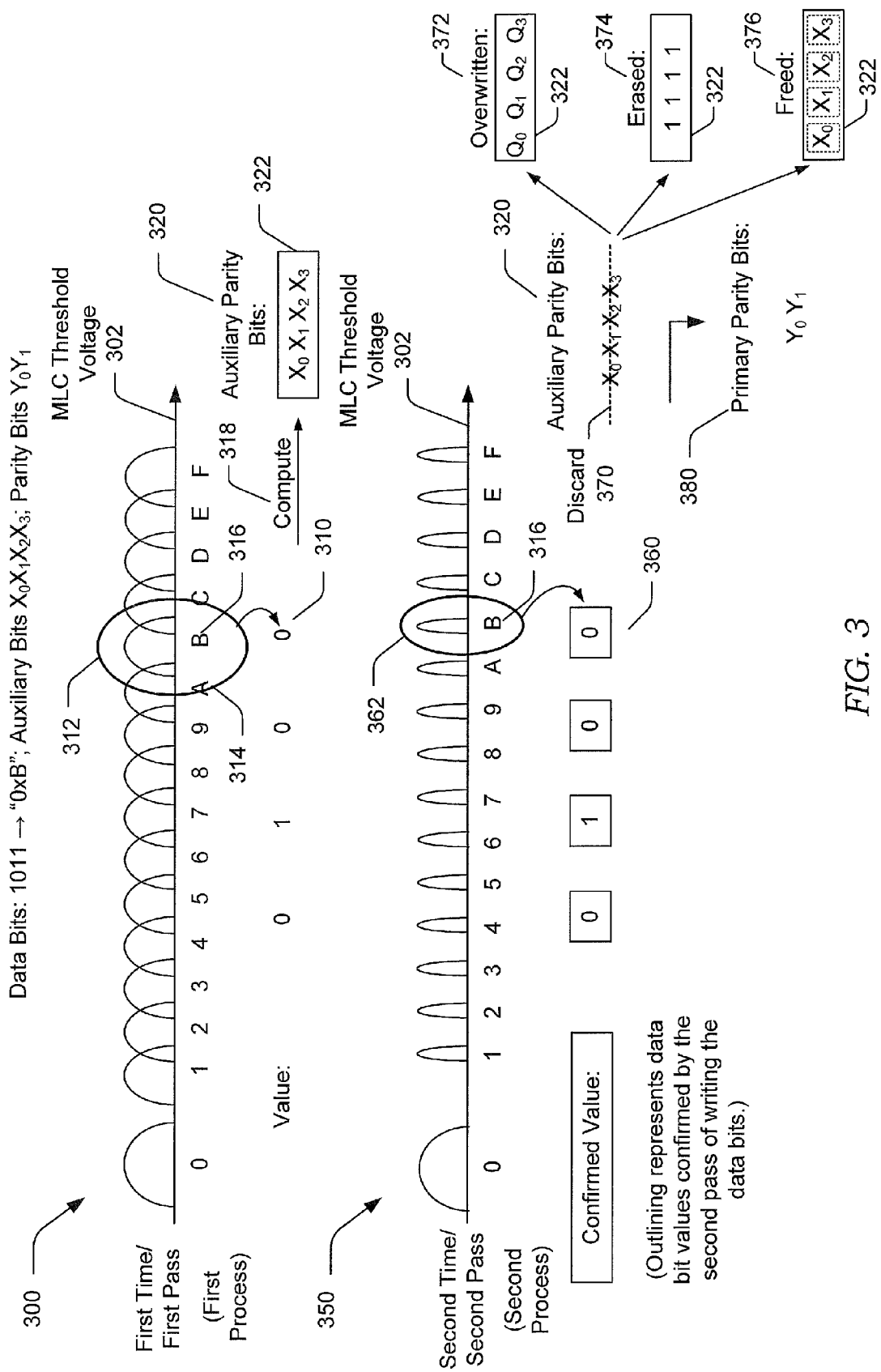
FIG. 3 is a diagram of data being written to a memory device in multiple passes with auxiliary parity bits being written in a separate memory location while the data is being written to the memory device.

FIG. 3 is a diagram of data 310 written to a memory device in multiple passes 300 and 350 with auxiliary parity bits 320 being written in a separate memory location while the data 310 is being written. A horizontal axis represents the MLC threshold voltage 302 that determines the data value stored in the cell. A representative distribution of threshold voltages is illustrated for each particular data value that can be stored by the cell. A height of each distribution curve along the vertical axis indicates a probability that a cell programmed to store the particular data value will have the corresponding threshold voltage.

In writing data to a memory, data bits and associated parity bits typically are combined in code words that may be several hundreds of bits or several thousands of bits in length. Error correction codes are generated by an ECC engine, such as the ECC engines 162 and 262 to be able to correct the errors in the codeword. The difference between data bits written in the first pass and data bits written after the second pass is that, after the second pass, the data bits may be read more reliably. Because the data bits may be read more reliably after the second pass, a shorter string of parity bits may be used to decode the data bits. According to a particular illustrative embodiment, a set of auxiliary parity bits for the data bits are written with the first pass. The auxiliary parity bits, which generally are longer than a set of primary parity bits to be maintained along with the data bits, may be used to decode the data bits after a first pass even when decoding of the data bits may be less reliable. However, after the data bits are written in a second pass that enables the data bits to be read more reliably, the auxiliary parity bits may be released to free the storage used to write the auxiliary parity bits for other uses.

Although the data bits and parity bits may be contained in codewords that are hundreds or thousands of bits in length, for the sake of visual clarity, a very basic, symbolically-representative four-bit string of data values is shown being written, along with a few associated primary parity bits and auxiliary parity bits. Specifically, the exemplary data 310 being written is a four-bit value 0100 (hexadecimal 0xB, represented as "B" at 316 in FIG. 3). As common in flash memory "0" represents a programmed state and "1" represents an erased state, therefore '0' and '1' are reversed from the usual representation.

The data 310 is written to a multi-level cell in a two-pass process. After the first pass 300, the probability distribution of the threshold voltage of the multi-level cell threshold voltage 302 is represented by the curve 312, i.e., the threshold voltage of the cell may be anywhere along the x axis covered by the curve 312, where the height of the curve at any given point x0 is proportional to the probability of having the threshold voltage equal to x0. When reading the threshold voltage, the represented value 312 may be ambiguous and may be mistakenly read as a value 0xA (0101) 314 or mistakenly read as a value 0xC (0011). Primary parity bits 380 written using a same, two-pass process may not be sufficient for correctly decoding, or the primary parity bits themselves may not be unambiguous after the first pass 300. The written value of the data (or of the primary parity bits) may become unambiguous after the second pass 350 in writing the data. Writing the data 310 may be performed the first time during the first pass 300 using a first process and writing the data 310 the second time during the second pass 350 may be performed using a second process. The first process may have a lower writing precision than the second process, such that decoding of the data 310 is more reliable after writing the data 310 during the second pass 350 using the second process.

However, because the written value 312 may be ambiguous after the first pass 300, it may be desirable to generate auxiliary parity bits 320 for the data 310 by computing a long codeword using the ECC engine 162. The number of auxiliary parity bits 320 and the computation of the auxiliary parity bits 320 are selected based on the method used to write the data 310 so that the data 310 can be unambiguously decoded from the written value 312 using the auxiliary parity bits 320. The auxiliary parity bits are written to cells 322, such as cells at a second physical address 132 in a second group 126 of memory cells in a single level cell partition 150, as shown in FIG. 1.

A second pass 350 results in writing a confirmed data value 360 that, generally, represents a particular set of data bits with a higher reliability than after the first pass. The confirmed written value 360 is represented by encircling digits of the data 310 in rectangular outlines, in FIG. 3. The second pass 350 results in writing an unambiguous written value 362 having the value 0xB 316. After the second pass 350 writes the unambiguous written value 362, the confirmed data value 360 may be read without using the auxiliary parity bits 320. Thus, after the second pass 350, it is possible to discard 370 the auxiliary parity bits 320. The auxiliary parity bits 320 may be discarded in a number of ways. The auxiliary parity bits 320 may be overwritten, at 372, with different data. For example, auxiliary data bits for a subsequently written data value may be written in the cells 322 in which the auxiliary parity bits 320 were previously written. Alternatively, the auxiliary parity bits 320 may be discarded by being erased, at 374. For example, values in the cells 322 where the auxiliary parity bits 320 were written may be reset to null values. The auxiliary parity bits 320 may be discarded by freeing, at 376, the cells 322 where the auxiliary parity bits 320 were written. Freeing the cells 322 enables the auxiliary parity bits 320 to be overwritten. Even though the auxiliary parity bits 320 are discarded 370, the primary parity bits 380 remain and may be used to decode the confirmed data 360.

By writing the auxiliary parity bits 320 for data bits after the first pass 300, the data bits may be decoded even if a power failure or another interruption interferes with the second pass 350 or other subsequent passes (not shown in FIG. 3) used to write the data bits. The auxiliary parity bits 320, which may include more bits than the primary parity bits (not shown in FIG. 3), may enable the data bits to be decoded when the primary parity bits may not enable unambiguous decoding of the data bits. However, the auxiliary parity bits 320 may be maintained only until the passes used to finish writing the data bits are complete. Thus, the auxiliary parity bits 320 are available for decoding the data bits if one or more additional passes to write the data are not completed, but the additional memory space used to write the auxiliary parity bits 320 is only used temporarily.

Figure 4:
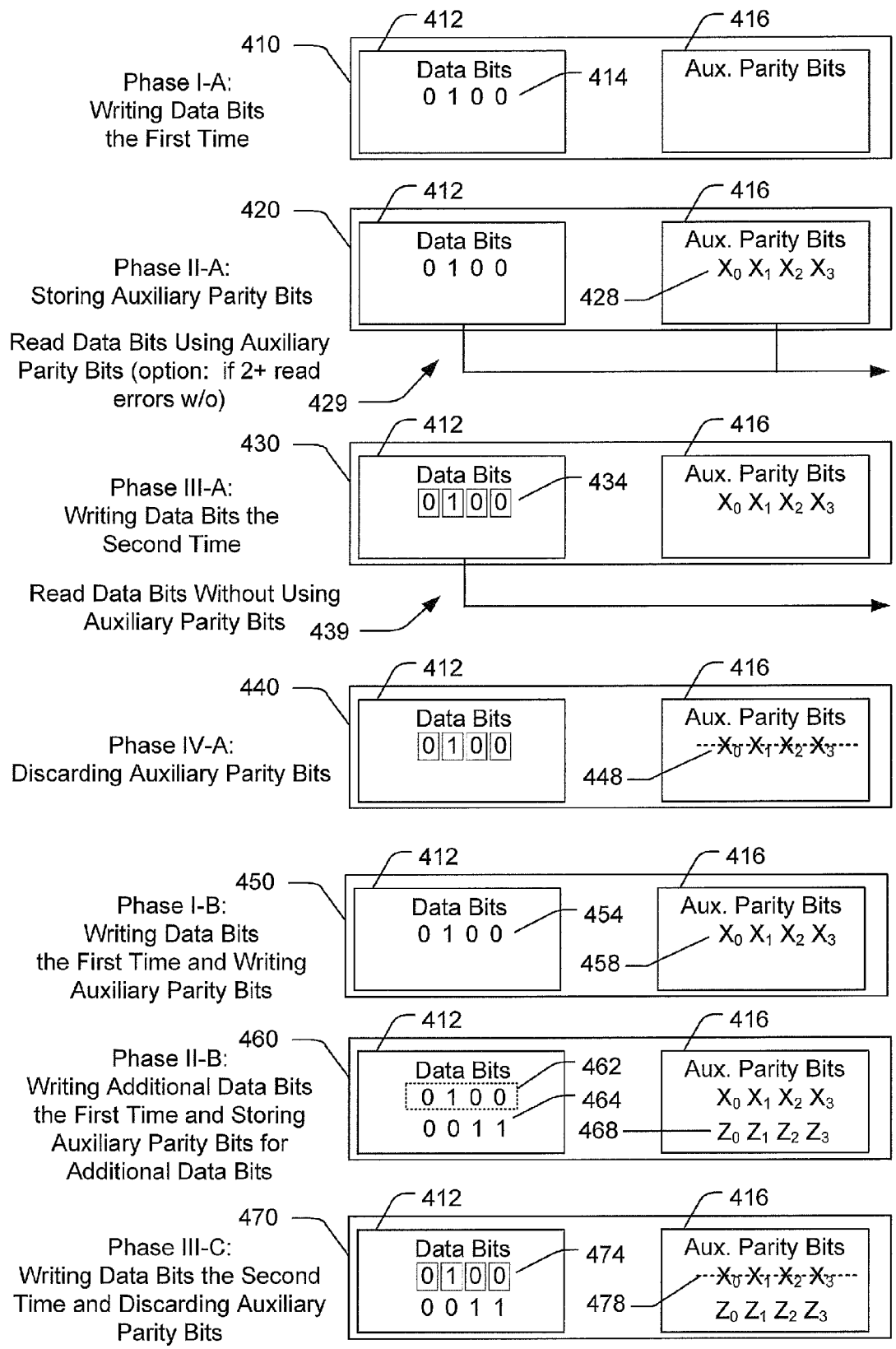
FIGS. 4 and 5 are block diagrams of alternative processes for writing and reading data bits and writing auxiliary parity bits in which data is written in two passes.
Figure 5:
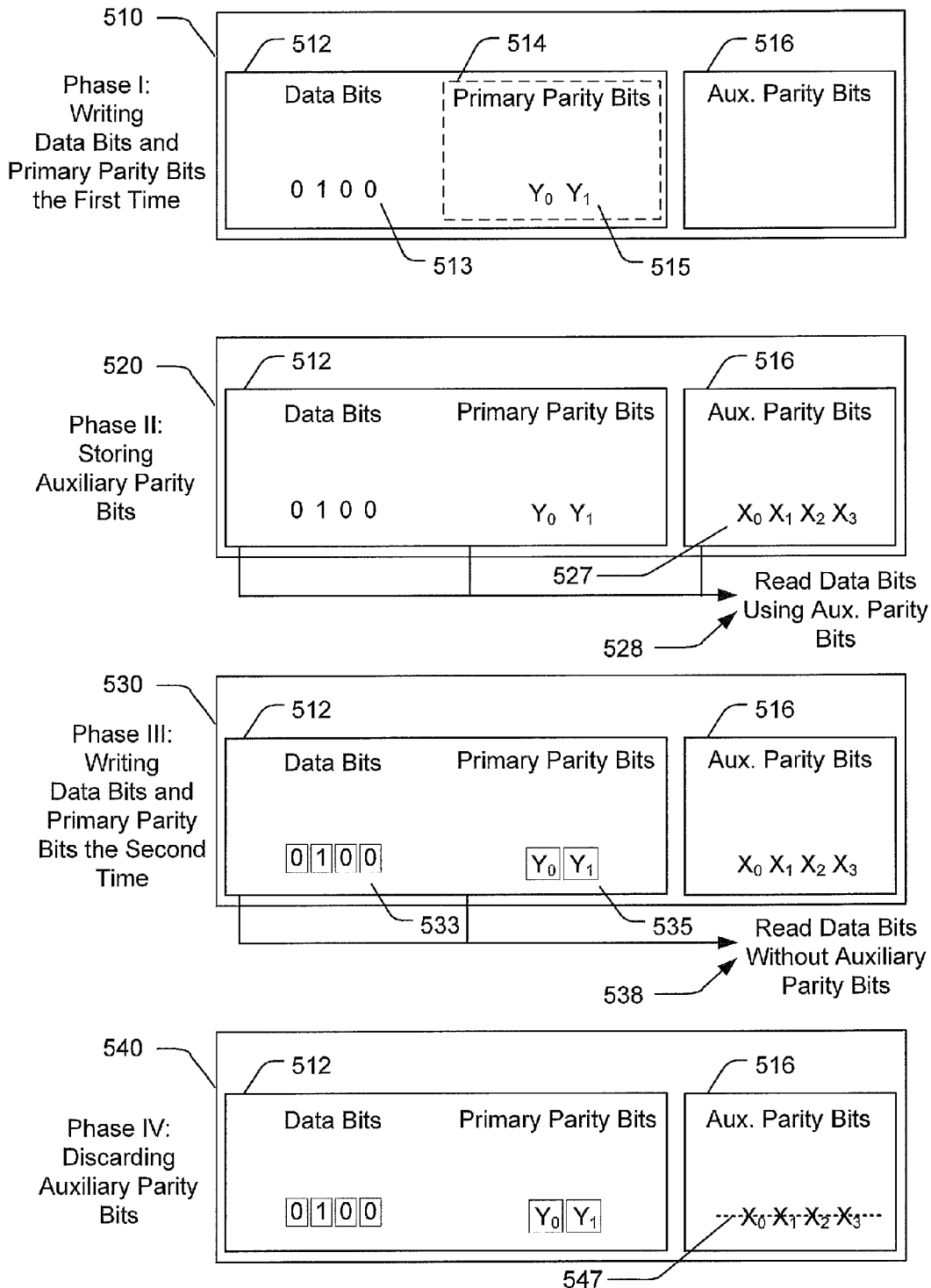

FIGS. 4 and 5 are block diagrams illustrating alternative processes for writing and reading data bits and auxiliary parity bits in which data is written in multiple passes. FIG. 4 illustrates the writing of data bits 414 in a first region 412 of multi-level cell partition and the writing or discarding of auxiliary parity 428 bits in a second region 416. FIG. 5 illustrates the writing of data bits 513 and primary parity 515 bits in a first region 512 of a multi-level cell partition and the writing or discarding of auxiliary parity bits 527 in a second region 516. As previously stated, the strings of data bits written in the multi-level cell partition of a memory device typically are much longer than the four-bit string used in FIGS. 4 and 5. The simple four-bit string is used to illustrate how the data bits are written in conjunction with or in sequence with the auxiliary parity bits and the primary parity bits.

Referring to FIG. 4, in Phase I-A 410, data bits 414 are written a first time during a first pass to a first region 412 of the memory device. In Phase II-A 420, auxiliary parity bits 428 generated for the data bits 414 are written in a second region 416 of the memory device. As described with reference to FIG. 1, the first region 412 of the memory device may include part of a multi-level cell partition while the second region 416 of the memory device may include part of a single-level cell partition. Alternatively, as described with reference to FIG. 2, both the first region 412 and the second region 416 may include different portions of a multi-level cell partition. Once the auxiliary parity bits 428 are written in Phase II-A 420, before a second pass of writing the data, reading, at 429, of the data bits 414 may be performed using the auxiliary parity bits 428. The auxiliary parity bits 428 may be used in an attempt to read the data bits 414 before the second pass of writing the data or the auxiliary parity bits 428 may be used in certain circumstances, for example, when one or more attempts to decode the data bits 414 without using the auxiliary parity bits 428 have failed to successfully disambiguate the data bits 414 represented by the written threshold voltage used to represent multiple data bit values in the first region 412 of the memory device.

In Phase III-A 430, a second pass is made to write the data bits a second time, to write confirmed data bits 434 in the first region 412. (As described with reference to FIG. 3, the confirmed data bits 434, having been written in first and second passes, are signified by outlining the digits of the data bits in FIG. 4.) With the confirmed data bits 434 having been written, reading, at 439, of the confirmed data bits 434 may be performed without using the auxiliary parity bits 428 written in the second region 416.

In Phase IV-A 440, because the auxiliary parity bits 428 may have become unnecessary, the auxiliary parity bits 428 are discarded 448. As described with reference to FIG. 3, discarding 448 the auxiliary parity bits 428 may involve overwriting 372 the auxiliary parity bits 428, erasing 374 the auxiliary parity bits 428, or freeing 376 cells writing the auxiliary parity bits 428 so that the cells may be reused. The auxiliary parity bits 428 may be discarded 448 after the data bits are written during the second pass. Thus, storage for auxiliary parity bits 428 need not be allocated in the second region 416 for every set of data bits that may be accommodated in the first region 412.

In an alternative process for writing data bits, in Phase I-B 450, a first pass of writing data bits 454 and auxiliary data bits 458 for the data bits 454 is performed in a single task. In contrast, in Phase I-A 410 and Phase II-A 420, the first pass of writing the data bits 414 and writing the auxiliary parity bits 428 for the data bits 414 were performed in two successive sequential tasks. Writing the data bits 454 and writing the auxiliary parity bits 458 for the data bits 454 are performed contemporaneously in Phase I-B 450.

In Phase II-B 460, before the data bits 454 are written in a second pass, additional data bits 464 are written to other cells in the first region 412. Contemporaneously, auxiliary parity bits 468 for the additional data bits 464 are written to the second region 416. The process of writing the additional data bits 464 may disturb the written threshold voltage written in the first region 412 representing the data bits 454. Thus, writing the additional data bits 464 may result in a degradation of a reliability of the data bits 454, resulting in degraded data bits 462. (The potential disturbance of the data bits 454 resulting in the disturbed data bits 462 is represented by a dotted outline in Phase II-B 460.) As a result of the potential disturbance of the data bits 454 by the writing of the additional data bits 464, the auxiliary parity bits 458 written for the data bits 454 may become useful in decoding the data bits 454 until the data bits 454 are confirmed by a second pass. In Phase III-C 470, a second pass of writing the data bits 454 is performed, resulting in confirmed data bits 474 being written in the first region 412.

Once the confirmed data bits 474 are written, the auxiliary parity bits 458 written in the second region 416 for the data bits 474 are discarded directly after the second pass of writing the data bits. By contrast, in Phase III-A 430, the data bits are written in a second pass and, in a separate phase, in Phase IV-A 440, the auxiliary bits 448 are subsequently discarded. However, in Phase III-C 470, the data bits 474 are written a second time and the auxiliary parity bits 448 are discarded directly thereafter, at 478, in the same phase. Discarding the auxiliary parity bits 458 directly after writing the data bits 474 the second time, at 478, more quickly frees cells used to write the auxiliary parity bits 458 for other uses.

Although not shown in FIG. 4, the second pass to write the confirmed data bits 474 may disturb the written threshold voltage representing the additional data bits 464. However, as previously described, the auxiliary parity bits 468 written for the additional data bits 464 may enable decoding of the additional data bits 464 even if the written threshold voltage has potentially been disturbed.

Referring to FIG. 5, an exemplary process is shown in which both data bits and primary parity bits are written in a first region 512 of a multi-level cell partition and auxiliary parity bits are written to a second region 516 of a memory device. Although the data bits and primary parity bits are shown being written to adjacent locations in a same, first region 512 of the memory device, the primary parity bits also may be stored in a separate region 514 (represented by a dashed line) at a separate physical address of the memory device, if desired.

The auxiliary parity bits are written to the second region 516 that may include either a single-level cell partition, as shown in FIG. 1, or a multi-level cell partition, as shown in FIG. 2. In either case, the auxiliary parity bits are written to a separate region from the data bits and the primary parity bits to enable the auxiliary parity bits to be released when no longer needed.

In Phase I 510, a first pass is made to write the data bits 513 and the primary parity bits 515 in the first region 512 for a first time. In Phase II 520, auxiliary parity bits 527 generated for the data bits 513 are written to the second region 516. Once the auxiliary parity bits 527 are written, the data bits may be decoded or read, at 528, using the auxiliary parity bits 527 or by using both the first-pass primary parity bits 515 and the auxiliary parity bits 527.

In Phase III 530, confirmed data bits 533 and confirmed primary parity bits 535 are written to the first region 512. After the confirmed data bits 533 and the confirmed parity bits 535 have been written, a read, at 538, of the confirmed data bits 533 may be performed using the confirmed primary parity bits 535 without using the auxiliary parity bits 527. As a result, in Phase IV 540, the auxiliary parity bits 527 may be discarded, at 547, freeing the space in the second region 516 for other uses.

Figure 6:
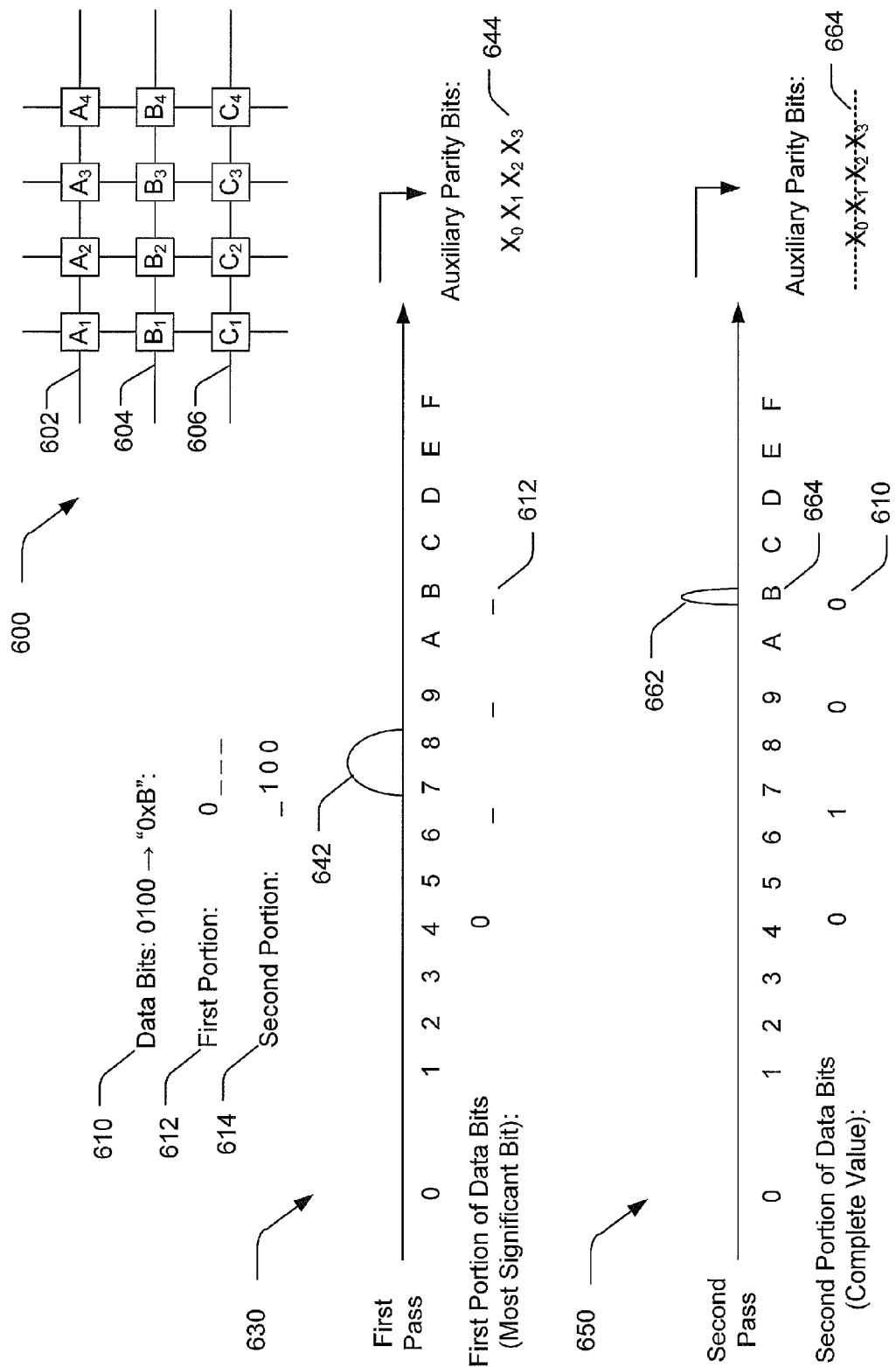
FIG. 6 is a diagram of data being written to a memory device in multiple portions with auxiliary parity bits being written in a separate memory location while the data is being written in the multiple portions of the memory device.

FIG. 6 is a diagram of data written to a memory device in multiple portions in multiple passes 630 and 650 with auxiliary parity bits 644 being written in a separate memory location. A multi-level cell structure 600 in which cells are coupled to adjacent word lines 602, 604, 606, writing data on one of the word lines, such as word line 604, might disturb threshold voltages written in one or more other word lines, such as word lines 602 and 606. Thus, in one exemplary process, a portion of a data value representing a most significant bit may be written in one pass and a second portion of the data value representing the less significant bits may be written in a successive pass. Writing the data in two passes overcomes disturbance to the first portion of the data value caused by data being written on other word lines and also confirms or clarifies the written threshold voltage values representing the data bits being written. Thus, writing the second portion of the data bits increases a reliability of the first portion of the data bits.

In FIG. 6, as in the example of FIG. 3, the data 610 being written is a four-bit value 0100 (hexadecimal 0xB, represented as "B" at 660 in FIG. 6). The data bits 610 are divided into two portions: a first portion 612 including a most significant bit (0 _ _ _) of the data bits 610 and a second portion 614 including the less significant bits (_ 1 0 0) of the data bits 610. The first portion 612 is written during the first pass 630, as represented by a threshold voltage value 642. Because only a portion of the data bits 610 have been written, auxiliary parity bits 644 may be written in a single level cell partition (not shown in FIG. 6) from which the data bits 610 may be decoded in the event the second pass 650 is interrupted before the second portion 612 of the data bits 610 are written. Alternatively, the auxiliary parity bits 644 may be written to a multi-level cell partition in a sufficiently long string or in another such way that auxiliary parity bits written in a multi-level cell may be used to decode the data bits even if the writing of the auxiliary parity bits is interrupted before successive passes or portions of writing are completed.

Figure 7:
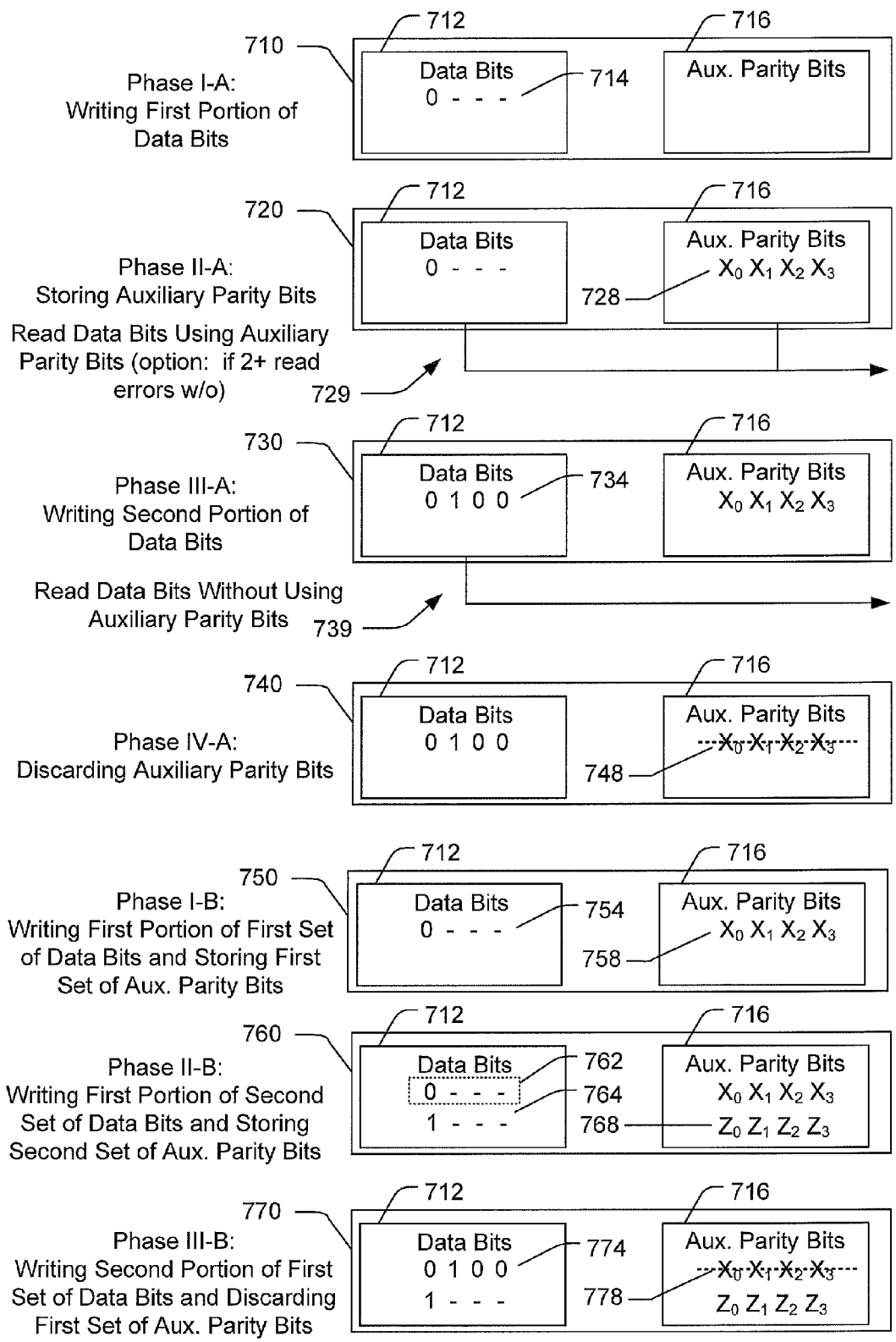
FIGS. 7 and 8 are block diagrams of alternative methods for writing and reading data bits and writing auxiliary parity bits in which data is written in multiple portions of the memory device.
Figure 8:
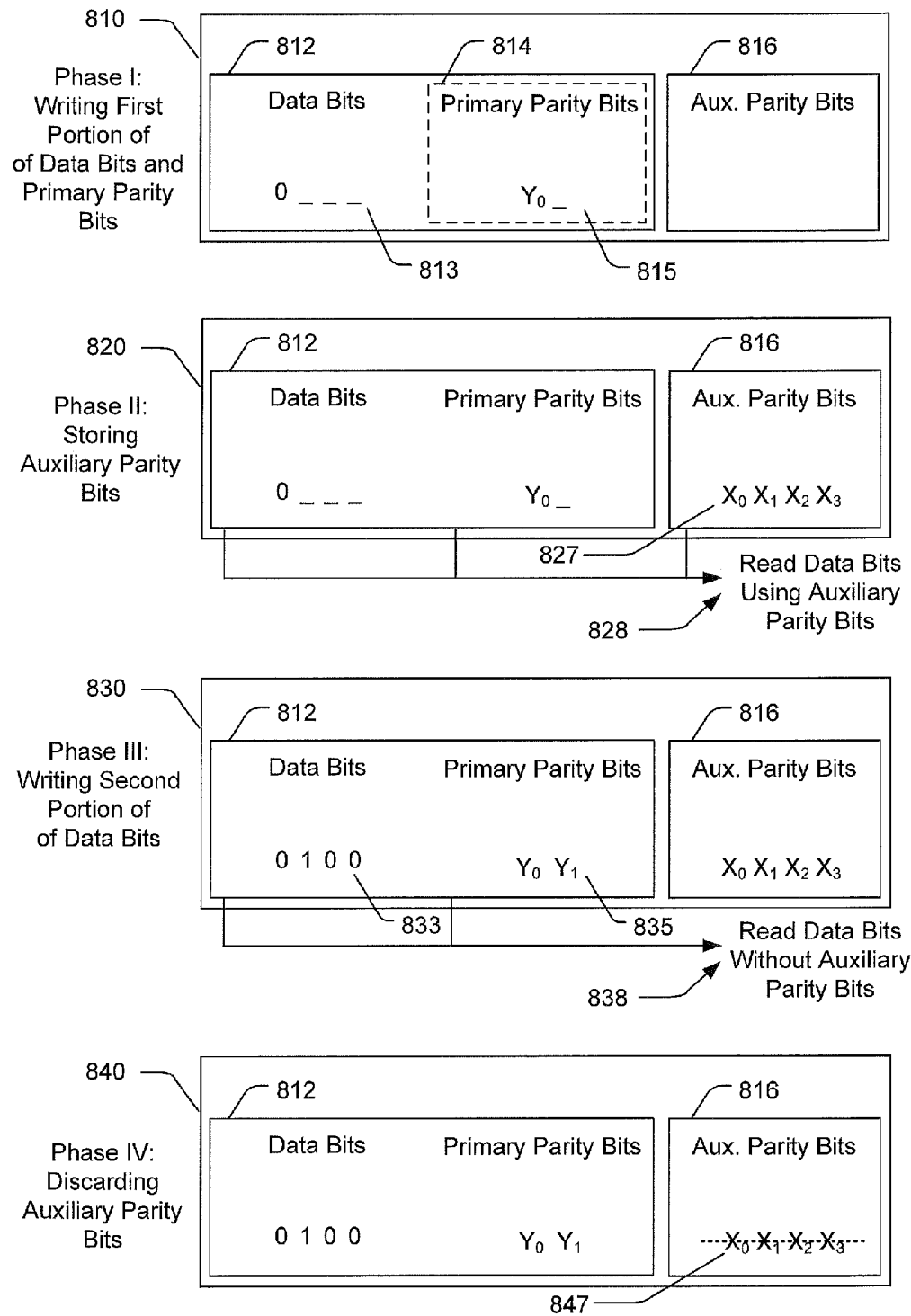

During the second pass 650, the second portion 614 of the data bits are written, resulting in a written threshold voltage value 662 written to the multi-level cell from which the data bits 610 may be decoded. After the second pass 650, the auxiliary parity bits 644 may be discarded, at 664, as described with reference to FIG. 3. As shown in FIGS. 7 and 8, just as the data bits 610 are written in portions, primary parity bits (not shown in FIG. 6) also may be written in portions. The data bits 610 may be written to one multi-level cell portion while the primary parity bits are written to another multi-level cell portion. Both the data bits 610 and the primary parity bits may be written in a two-pass process. If parity bits are to be used in decoding the data bits 610 after the second pass 650, the primary parity bits may be sufficient to decode the data bits 610 without use of the auxiliary parity bits 644. Discarding 664 of the auxiliary parity bits 644 thus frees the cells used to write the auxiliary parity bits 644 for other uses.

FIGS. 7 and 8 are block diagrams of alternative processes for writing and reading data bits and auxiliary parity bits in a system in which data is written in multiple portions of a memory device. FIG. 7 illustrates the writing of portions of data bits 734 in a first region 712 and the writing or discarding of auxiliary parity bits 728 in a second region 716.

Referring to FIG. 7, in Phase I-A 710, a first portion 714 of data bits 734 is written a first time in a first pass to a first region 712 of a multi-level cell partition. In Phase II-A 720, auxiliary parity bits 728 generated for the data bits 734 (of which only the first portion of the data bits 714 is written in Phase I-A 710) are written to a second region 716. As described with reference to FIG. 1, the first region 712 of the memory device may include part of a multi-level cell partition while the second region 716 of the memory device may include part of a single-level cell partition. Alternatively, as described with reference to FIG. 2, both the first region 712 and the second region 716 may include different portions of a multi-level cell partition. Once the auxiliary parity bits 728 are written in Phase II-A 720, before a second portion of the data bits 734 is written, reading, at 729, of the data bits 734 from the first portion 714 of the data bits 734 may be performed using the auxiliary parity bits 728. The auxiliary parity bits 728 may be used in an attempt to read the data 734 before the second portion of the data bits 734 is written.

In Phase III-A 730, the second portion of the data bits 734 is written to the first region 712 to complete the writing of the data bits 734. With the writing of the data bits 734 having been completed, a read, at 739, of the data bits 734 may be performed without using the auxiliary parity bits 728 written in the second region 716. In Phase IV-A 740, because the auxiliary parity bits 728 may have become unnecessary, the auxiliary parity bits 728 are discarded 748. As described with reference to FIG. 3, discarding 748 the auxiliary parity bits 728 may involve overwriting the auxiliary parity bits 728, erasing the auxiliary parity bits 728, or freeing 776 the cells writing the auxiliary parity bits 728 so that such cells may be reused. Because the auxiliary parity bits 728 may be discarded 748 after the second pass completes the writing of the data bits 734, the second region 716 may be smaller in size than the first region 712.

In an alternative process for writing data bits, in Phase I-B 750, writing a first portion 754 of the data bits 774 and writing of the auxiliary data bits 758 for the data bits 774 is performed in a single task. By contrast, in Phase I-A 710 and Phase II-A 720, writing the first portion 714 of the data bits 734 and the writing of the auxiliary parity bits 728 for the data bits 734 were performed in two successive sequential tasks. Writing the first portion 754 of the data bits 774 and writing the auxiliary parity bits 758 for the data bits 774 are performed contemporaneously in Phase I-B 750.

In Phase II-B 760, before the second portion of the data bits 774 is written, a first portion of additional data bits 764 is written to other cells in the first region 712. Contemporaneously, auxiliary parity bits 768 are written in the second region 716 for the additional data bits of which the first portion 764 is written during Phase II-B 760. The process of writing the first portion of additional data bits 764 may affect the written threshold voltage value at the first region 712 representing the first portion 754 of the data bits 774, resulting in a potentially disturbed first portion 762 of the data bits 774. (The potential disturbance of the first portion 754 of the data bits 774 is represented by a dotted outline in Phase I-B 760.) As a result of the potential disturbance resulting in the potentially disturbed first portion 762 of the data bits 774 by the writing of the first portion of additional data bits 764, the auxiliary parity bits 758 written for the data bits 774 may be used in decoding the data bits 774 until a second pass writes a second portion of the data bits 774.

In Phase III-B 770, a second portion of the data bits 774 is written in a second pass, completing the writing of the data bits 774 in the first region 712. Once the writing of the second portion of the data bits 774 has been completed, the auxiliary parity bits 748 written in the second region 716 for the data bits 774 may be discarded, at 778, freeing the cells used to write the auxiliary parity bits 748 for other uses.

Although not shown in FIG. 7, writing the second portion of the data bits 774 may disturb the written threshold voltage representing the first portion 764 of the additional data bits. However, as previously described, the auxiliary parity bits 768 written may enable decoding of the additional data bits even if the written threshold voltage representing the first portion 764 of the additional data bits has potentially been disturbed.

FIG. 8 illustrates the writing of portions of data bits 813 and the writing of portions of primary parity bits 815 in a first region 812 of a multi-level cell partition and illustrates temporary writing and discarding of auxiliary parity bits 827 in a second region 816. Referring to FIG. 8, an exemplary process is shown in which both data bits and primary parity bits are written in the first region 812 of a multi-level cell partition, respectively, and the second region 816 in which the auxiliary parity bits are written may be in a single-level cell partition, as in FIG. 1. The primary parity bits 815 may also be written in separate region 814 (represented by a dashed line in FIG. 8) of the multi-level cell partition, rather than being written in the same, first region 812 as shown in FIG. 8. Alternatively, the first region 812, and the second region 816 all may all be part of a multi-level cell partition, as in FIG. 2.

In Phase I 810, a first portion of data bits 833 and a first portion of the primary parity bits 815 are written in the first region 812. In Phase II 820, auxiliary parity bits 827 generated for the full set of data bits 833 are written in the second region 816. Once the auxiliary parity bits 827 are written, the data bits 833 may be read or decoded, at 828, from the first portion of the data bits 813 using the auxiliary parity bits 827 or by using both the first portion 815 of the primary parity bits 835 and the auxiliary parity bits 827.

In Phase III 830, the second portion of the data bits 833 and the second portion of the primary parity bits 835 are written to the first region 812, completing the writing of the data bits 833 and the primary parity bits 835. With the completed writing of the data bits 833 and the parity bits 835 written, a read 838 of the data bits 833 may be performed using the primary parity bits 835 without using the auxiliary parity bits 827. As a result, in Phase IV 840, the auxiliary parity bits 827 may be discarded, at 847, freeing the space in the second region 816 for other uses.

Figure 9:
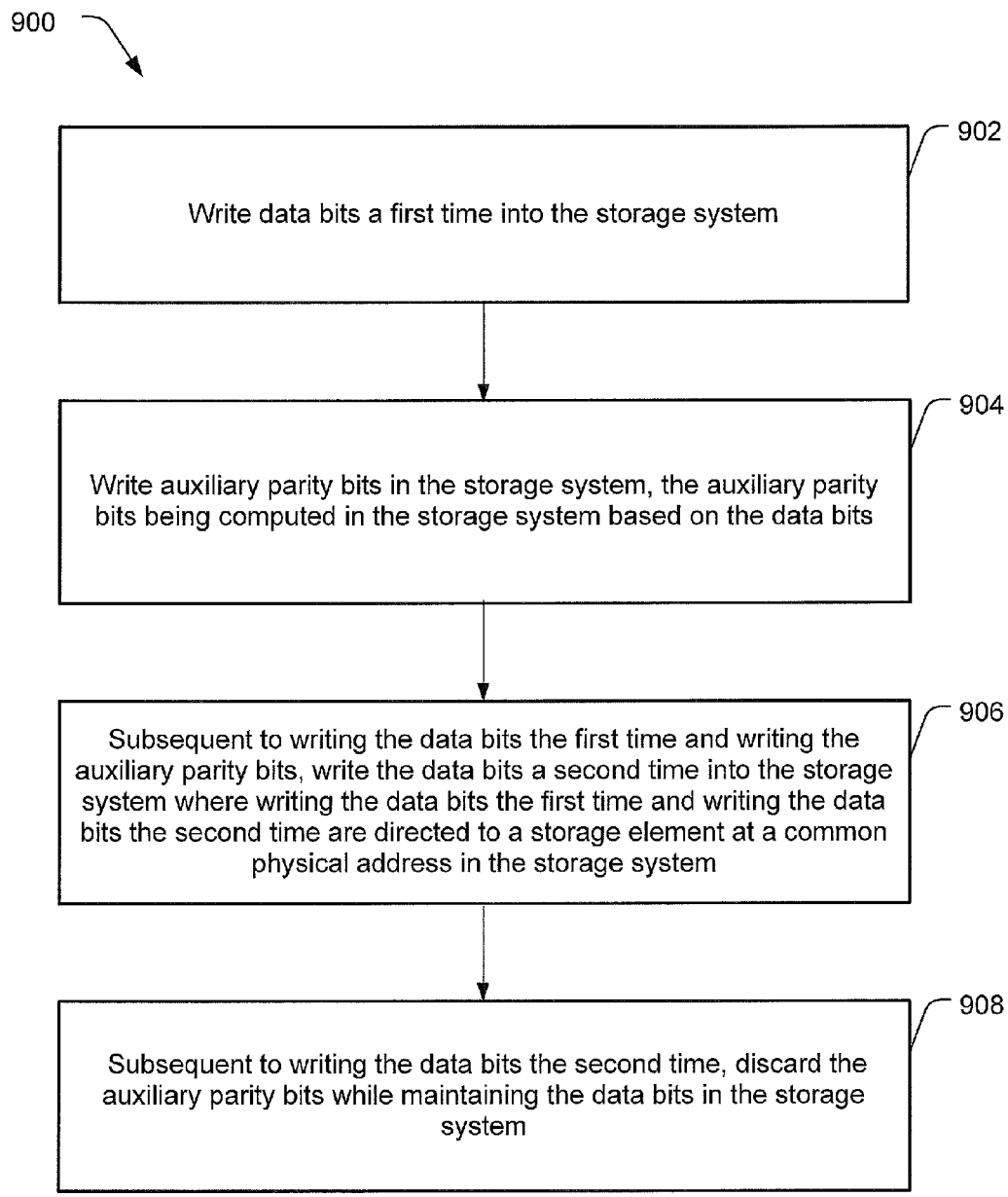
FIG. 9 is a flow diagram of a particular embodiment of a method of writing auxiliary parity bits when data is written in multiple passes.

FIG. 9 is a flow diagram of a particular embodiment of a method 900 of writing auxiliary parity bits when data is written in multiple passes. Data bits are written a first time into a storage system, at 902. The storage system may include any of a number of mass storage devices such as Secure Digital ("SD")-driven flash memory cards, flash storage devices, "Disk-on-Key" devices that are provided with a Universal Serial Bus ("USB") interface, USB Flash Drives, MultiMedia Cards ("MMCs"), SD cards, miniSD cards, microSD cards, Solid State Drives ("SSDs"), and similar devices. The data bits are written the first time in a first pass as described with reference to FIG. 3 and as shown in Phase I-A 410 of FIG. 4. Auxiliary parity bits are written in the storage system, at 904, where the auxiliary parity bits are computed based on the data bits. The auxiliary parity bits, such as the auxiliary parity bits 428 written in Phase II-A 420 of FIG. 4, may be written to a different partition and to a partition of a different cell type than the data bits (e.g., the data bits 414 of FIG. 4 are written in a multi-level cell partition 412 and the auxiliary parity bits 428 are written in a single level cell partition 416). Subsequent to writing the data bits a first time and writing the auxiliary parity bits, the data bits are written a second time into the storage system, at 906. Writing the data bits the first time and writing the data bits the second time are directed to one or more storage elements at a common physical address in the storage system. Writing the data bits the second time confirms and clarifies the data values, as described with reference to the second pass 350 of FIG. 3. Subsequent to writing the data bits the second time, the auxiliary parity bits are discarded while maintaining the data bits in the storage system, at 908. The auxiliary parity bits, such as the auxiliary parity bits 320 of FIG. 3, may be discarded by overwriting the auxiliary parity bits, at 372, erasing the auxiliary parity bits, at 374, or freeing the parity bits for storage of other values, at 376.

Figure 10:
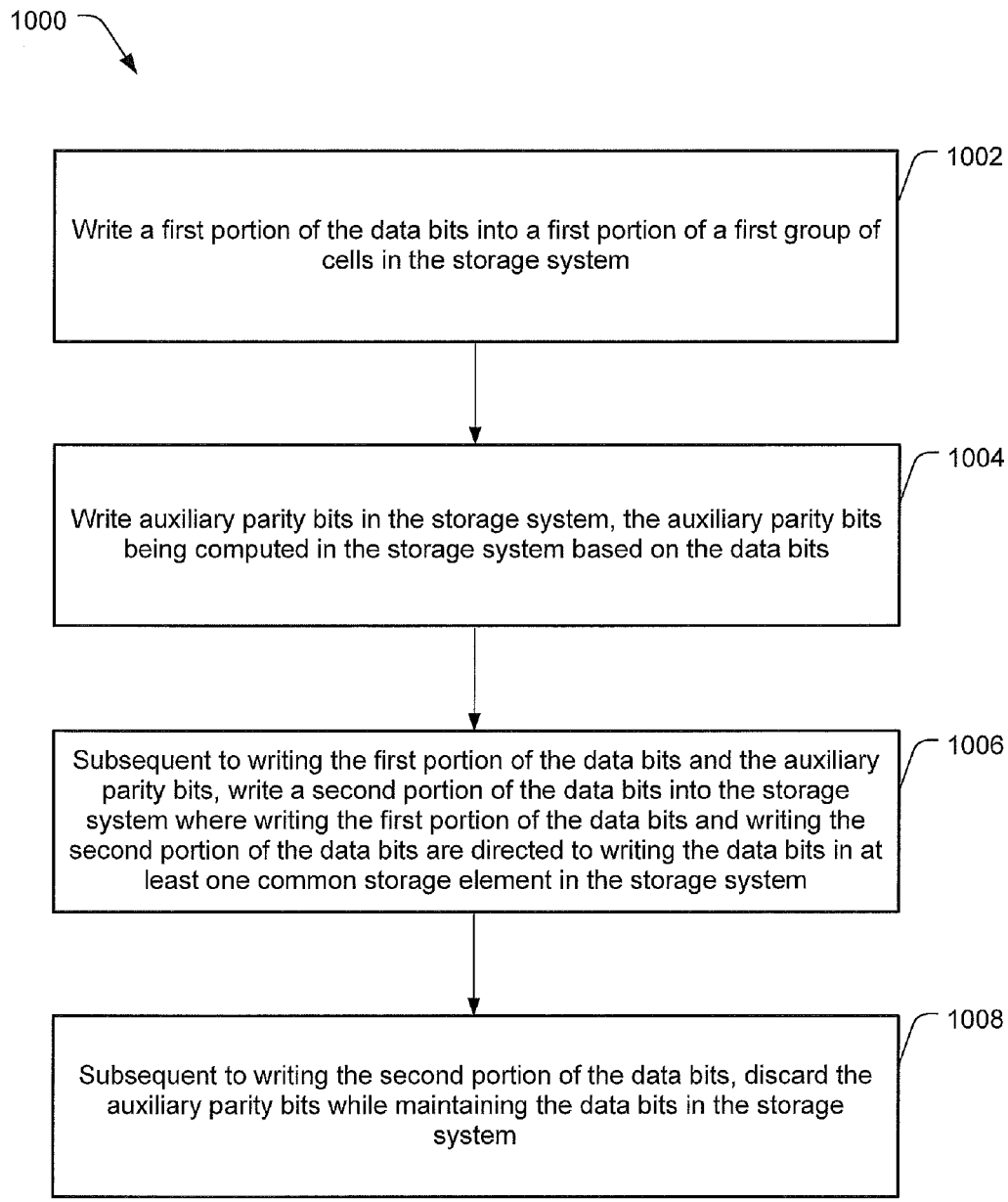
FIG. 10 is a flow diagram of a particular embodiment of a method of writing auxiliary parity bits when data is written in multiple portions.

FIG. 10 is a flow diagram of a particular embodiment of a method 1000 of writing auxiliary parity bits when data is written in multiple portions. A first portion of the data bits is written into a first portion of a first group of cells in the storage system, at 1002. As described with reference to FIG. 9, the storage system may include any number of flash storage devices according to SD, MMC, or other specifications. Auxiliary parity bits are written in the storage system, at 1004. The auxiliary parity bits may be computed based on the data bits. The auxiliary parity bits, such as the auxiliary parity bits 728 written in Phase II-A 720 of FIG. 7, may be written to a different partition and to a partition of a different cell type than the data bits (e.g., the data bits 734 of FIG. 7 are written in a multi-level cell partition 712 and the auxiliary parity bits 728 are written in a single level cell partition 716). Subsequent to writing the first portion of the data bits and writing the auxiliary parity bits, a second portion of the data bits is written into the storage system, at 1006. Writing the second portion of the data bits confirms the data values, as described with reference to the writing of the second portion of the data bits in a second pass 650 as described with reference to FIG. 6. The writing of the first portion of the data bits and the writing of the second portion of the data bits are directed to writing the data bits to one or more common storage elements in the storage system. Subsequent to writing the second portion of the data bits, the auxiliary parity bits are discarded while maintaining the data bits in the storage system, at 1008. The auxiliary parity bits, such as the auxiliary parity bits 320 of FIG. 3, may be discarded by overwriting the auxiliary parity bits, at 372, erasing the auxiliary parity bits, at 374, or freeing the parity bits for writing of other values, at 376

Although various components depicted herein are illustrated as block components and described in general terms, such components may include one or more microprocessors, state machines, or other circuits configured to enable the memory device 110 of FIG. 1 to perform the particular functions attributed to such components, or any combination thereof. For example, the controller 160 of FIG. 1, including the ECC engine 162, the write circuit 164, or the read circuit 166, may represent physical components, such as controllers, state machines, logic circuits, or other structures to enable the memory device 110 to receive and respond to data requests from a host device or from other external devices to write data to or read data from the array of memory cells 150.

For example, the controller 160 of FIG. 1 may be implemented using a microprocessor or microcontroller programmed to write data bits in multiple passes or in multiple portions and to write primary parity bits and auxiliary parity bits as described with reference to any of FIGS. 3-10. In a particular embodiment, the controller 160 includes executable instructions that are executed by a processor and the instructions are written at the array of memory cells 140. Alternatively, or in addition, executable instructions that are executable by the processor may be written at a separate memory location that is not a part of the array of memory cells 140, such as at a read-only memory (ROM) (not shown).

In a particular embodiment, the memory device 110 may be a portable device configured to be selectively coupled to one or more external devices. However, in other embodiments, the memory device may be attached or embedded within one or more host devices, such as within a housing of a portable communication device. For example, the storage device may be within a packaged apparatus, such as a wireless telephone, a personal digital assistant (PDA), a gaming device or console, a portable navigation device, or other device that uses internal non-volatile memory. In a particular embodiment, the memory device 110 is a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of writing data bits in a storage system, the method comprising:
    writing the data bits a first time into the storage system;
    writing auxiliary parity bits associated with the data bits in the storage system;
    subsequent to writing the data bits and subsequent to writing the auxiliary parity bits, writing the data bits a second time into the storage system, wherein writing the data bits the first time and writing the data bits the second time are directed to at least one storage element at a common physical address in the storage system; and
    subsequent to writing the data bits the second time, discarding the auxiliary parity bits while maintaining the data bits in the storage system.

2. The method of claim 1, wherein discarding the auxiliary parity bits includes at least one of:
    permitting the auxiliary parity bits to be overwritten;
    erasing the auxiliary parity bits; and
    identifying a location in the storage system where the auxiliary parity bits are written as being free for other data.

3. The method of claim 1, further comprising:
    computing primary parity bits for the data bits;
    substantially concurrently with writing the data bits the first time, writing the primary parity bits into the storage system; and
    substantially concurrently with writing the data bits the second time, writing the primary parity bits into the storage system.

4. The method of claim 1, further comprising decoding the data bits from the storage system, wherein:
    when the decoding is performed prior to writing the data bits the second time, the decoding is performed using the auxiliary parity bits; and
    when the decoding is performed subsequent to writing the data bits the second time, the decoding is performed without using the auxiliary parity bits.

5. The method of claim 4, wherein when the decoding is performed prior to writing the data bits the second time, decoding the data bits using the auxiliary parity bits when the decoding the data bits without using the auxiliary parity bits fails to provide all of the data bits.

6. The method of claim 1, wherein writing the data bits the first time is carried out with a lower reliability than writing the data bits the second time.

7. The method of claim 1, wherein the data bits are written at a first region of the storage system and the auxiliary parity bits are written at a second region of the storage system, and wherein the second region is not adjacent to the first region.

8. The method of claim 1, wherein writing the data bits the first time and the writing of the auxiliary parity bits are performed substantially concurrently.

9. The method of claim 1, wherein discarding of the auxiliary parity bits is performed directly after writing the data bits the second time.

10. The method of claim 1, further comprising writing additional data bits in the storage system, wherein writing the additional data bits is performed subsequent to writing the data bits the first time and prior to writing the data bits the second time.

11. The method of claim 10, wherein writing the additional data bits causes a degradation of a reliability of the data bits written into the storage system.

12. A method for writing data bits in a storage system, the method comprising:

writing a first portion of the data bits into the storage system;

writing auxiliary parity bits associated with the data bits in the storage system;

subsequent to writing the first portion of the data bits and subsequent to writing the auxiliary parity bits, writing a second portion of the data bits into the storage system, wherein writing the first portion of the data bits and writing the second portion of the data bits are directed to writing the data bits in at least one common storage element in the storage system; and subsequent to writing the second portion of the data bits, discarding the auxiliary parity bits while maintaining the data bits in the storage system.

13. The method of claim 12, wherein discarding the auxiliary parity bits includes at least one of:

permitting the auxiliary parity bits to be overwritten;

erasing the auxiliary parity bits; and identifying a location in the storage system where the auxiliary parity bits are written as being free for other data.

14. The method of claim 12, further comprising:

computing primary parity bits for the first portion of the data bits; and substantially concurrently with writing the first portion of the data bits, writing the primary parity bits into the storage system.

15. The method of claim 12, wherein writing the second portion of the data bits increases a reliability of the first portion of the data bits.

16. The method of claim 12, wherein the auxiliary parity bits are written in a second storage element at a second region of the storage system in a single-level cell partition and the first portion of the data bits and the second portion of the data bits are written at a first region of the storage system in at least one multi-level cell partition, wherein the second region is not adjacent to the first region.

17. The method of claim 12, wherein writing the first portion of the data bits and writing the auxiliary parity bits are performed substantially concurrently.

18. The method of claim 12, further comprising decoding the first portion of the data bits from the storage system, wherein:

when the decoding is performed prior to writing the second portion of the data bits, the decoding is performed using the auxiliary parity bits; and when the decoding is performed subsequent to writing the second portion of the data bits, the decoding is performed without using the auxiliary parity bits.

19. The method of claim 18, wherein when performing the decoding prior to writing the second portion of the data bits without using the auxiliary parity bits fails to provide all of the data bits, performing the decoding of the data bits using the auxiliary parity bits.

20. The method of claim 12, wherein the discarding of the auxiliary parity bits is performed directly after writing the second portion of the data bits.

21. The method of claim 12, further comprising writing additional data bits in the storage system, wherein the writing of the additional data bits is performed subsequent to writing the first portion of the data bits and prior to writing the second portion of the data bits.

22. The method of claim 21, wherein the writing of the additional data bits causes a degradation of a reliability of the first portion of the data bits written into the storage system.

23. A memory device comprising:

an error correction code engine configured to generate auxiliary parity bits for a plurality of data bits;

an array of memory cells; and a write circuit coupled to the error correction code engine and to the array of memory cells, the write circuit configured to:

write the data bits at a first time to a first storage element of the array of memory cells at a first physical address;

write the auxiliary parity bits for the data bits in a second storage element of the array of memory cells at a second physical address;

subsequent to writing the data bits at the first time to the first storage element at the first physical address, writing the data bits at a second time to the first storage element at the first physical address; and subsequent to writing the data bits at the second time, discarding the auxiliary parity bits written in the second storage element at the second physical address while maintaining the data bits in the first storage element.

24. The memory device of claim 23, wherein the write circuit is further configured to discard the auxiliary parity bits by at least one of permitting the auxiliary parity bits to be overwritten, erasing the auxiliary parity bits, and identifying the second storage element where the auxiliary parity bits are written as being free for other data.

25. The memory device of claim 23, wherein the error correction code engine is further configured to generate primary parity bits.

26. The memory device of claim 25, wherein the write circuit is further configured to write the primary parity bits in a separate storage element of the array of memory cells at a separate physical address substantially concurrently with the write circuit writing the data bits the first time to the first storage element at the first physical address.

27. The memory device of claim 25, wherein the write circuit is further configured to write the primary parity bits in a separate storage element of the array of memory cells at a separate physical address substantially concurrently with the write circuit writing the data bits the second time to the first storage element at the first physical address.

28. The memory device of claim 26, wherein the write circuit is further configured to write the data bits the first time using a first process and to write the data bits the second time using a second process, wherein the first process has a lower writing precision than the second process.

29. The memory device of claim 23, wherein the second physical address is in a second region and the first physical address is in a first region, and wherein the second region is not adjacent to the first region.

30. The memory device of claim 23, wherein the write circuit is configured to write the auxiliary parity bits substantially concurrently with writing the data bits the first time.

31. The memory device of claim 23, further comprising a decoding circuit configured to:

decode the data bits and the auxiliary parity bits and provide the data bits and the auxiliary parity bits to the error correction code engine when the data bits are decoded prior to the write circuit writing the data bits the second time; and decode the data bits without using the auxiliary parity bits when the data bits are decoded subsequent to the write circuit writing the data bits the second time.

32. The memory device of claim 23, wherein the write circuit is configured to discard the auxiliary parity bits directly after the write circuit writes the data bits the second time.

33. The memory device of claim 23, wherein the write circuit is configured to write a plurality of additional data bits in the array of memory cells subsequent to the write circuit writing the data bits the first time and prior to writing the data bits the second time.

34. A memory device comprising:
an error correction code engine configured to generate auxiliary parity bits for a plurality of data bits;
an array of memory cells; and
a write circuit coupled to the error correction code engine and to the array of memory cells, wherein the write circuit is configured to:
write a first portion of the data bits to a first group of memory cells;
write the auxiliary parity bits in a second group of memory cells;
subsequent to writing the first portion of the data bits to the first group of memory cells, writing a second portion of the data bits to the first group of memory cells; and
subsequent to writing the second portion of the data bits, discard the auxiliary parity bits written in the second group of memory cells while maintaining the data bits written in the first group of memory cells.

35. The memory device of claim 34, wherein the write circuit is further configured to discard the auxiliary parity bits by at least one of permitting the auxiliary parity bits to be overwritten, erasing the auxiliary parity bits, and identifying the second group of cells where the auxiliary parity bits are written as being free for other data.

36. The memory device of claim 34, wherein the error correction code engine is further configured to generate primary parity bits.

37. The memory device of claim 36, wherein the write circuit is further configured to write the primary parity bits in a third group of memory cells substantially concurrently with the first portion of the data bits being written to the first group of memory cells.

38. The memory device of claim 34, wherein the second group of memory cells is written in a second region and the first group of memory cells is written in a first region, wherein the second region is not adjacent to the first region.

39. The memory device of claim 34, wherein the write circuit is configured to write the first portion of the data bits substantially concurrently with writing the auxiliary parity bits.

40. The memory device of claim 34, further comprising a decoding circuit configured to:
decode the first portion of the data bits and provide the first portion of the data bits and the auxiliary bits to the error correction code engine when the decoding is performed prior to the write circuit writing the second portion of the data bits; and
decode the data bits without using the auxiliary parity bits when the decoding is performed subsequent to the write circuit writing the second portion of the data bits.

41. The memory device of claim 34, wherein the write circuit is configured to write at least a first portion of a plurality of additional data bits in the array of memory cells subsequent to the write circuit writing the first portion of the data bits and prior to writing the second portion of the data bits.

* * * * *